United States Patent
Kim et al.

(10) Patent No.: US 7,607,780 B2
(45) Date of Patent: Oct. 27, 2009

(54) PROJECTION-TYPE 3-D IMAGE DISPLAY USING SINGLE PROJECTOR

(75) Inventors: Tae-hee Kim, Suwon-si (KR);
Sung-yong Jung, Suwon-si (KR);
Kun-ho Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 11/262,854

(22) Filed: Nov. 1, 2005

(65) Prior Publication Data

US 2006/0146287 A1 Jul. 6, 2006

(30) Foreign Application Priority Data

Dec. 30, 2004 (KR) .................. 10-2004-0116956

(51) Int. Cl.
*G03B 21/00* (2006.01)
*G03B 21/14* (2006.01)
*G02F 1/1335* (2006.01)
*G03B 21/60* (2006.01)
*G02B 5/30* (2006.01)
*G02B 27/22* (2006.01)
*G02B 27/26* (2006.01)
*G02B 27/28* (2006.01)
*H04N 15/00* (2006.01)

(52) U.S. Cl. .................. 353/10; 353/7; 353/8; 353/20; 349/9; 349/15; 359/458; 359/465; 359/478; 359/494; 348/55; 348/57; 348/58; 348/59

(58) Field of Classification Search ............ 353/10, 353/7, 8, 20, 30, 121, 122; 349/5, 7, 8, 11, 349/15, 96, 177, 179, 186, 194, 201, 9; 359/13, 359/443, 458, 462–465, 467, 471–473, 475, 359/478, 479, 494, 495, 497, 618, 621–625, 359/627–630, 632, 638–640, 880; 348/42, 348/54, 57–59, 115, 739, 744, 752, 750, 348/751, 758, 762, 771, 55; 345/6–8, 154, 345/419

See application file for complete search history.

(56) References Cited

U.S. PATENT DOCUMENTS 4,754,327 A 6/1988 Lippert (Continued)

FOREIGN PATENT DOCUMENTS

JP 9-107562 4/1997

(Continued)

*Primary Examiner*—Rochelle-Ann J Blackman
(74) *Attorney, Agent, or Firm*—Stanzione & Kim LLP

(57) ABSTRACT

A projection-type 3-D image display includes a light source, a single display element, an image shift member, a projection lens unit, and a screen unit. The display element produces an image using light emitted from the light source. The image shift member time-sequentially shifts the image. The projection lens unit enlarges and projects the time sequentially shifted image. The screen unit includes an image separation unit. The image separation unit separates the time sequentially shifted image into images for a left eye and images for a right eye. The projection-type 3-D image display can realize a 3-D image using a single projector by having the image shift member to sequentially shift the images produced by the display element.

21 Claims, 8 Drawing Sheets

U.S. PATENT DOCUMENTS

| | | | |
|---|---|---|---|
| 5,872,590 A * | 2/1999 | Aritake et al. | 348/57 |
| 6,057,878 A * | 5/2000 | Ogiwara et al. | 348/56 |
| 2002/0093718 A1 * | 7/2002 | Slack et al. | 359/246 |
| 2004/0135499 A1 * | 7/2004 | Cok | 313/506 |

FOREIGN PATENT DOCUMENTS

| | | |
|---|---|---|
| JP | 9-281616 | 10/1997 |
| JP | 10-221795 | 8/1998 |
| KR | 7-15752 | 1/1995 |
| KR | 2000-8389 | 2/2000 |
| KR | 2004-63227 | 7/2004 |
| KR | 2004-71100 | 8/2004 |
| WO | WO 2004088995 A1 * | 10/2004 |

* cited by examiner

IMAGES FOR LEFT EYE          IMAGES FOR RIGHT EYE

PROJECTION-TYPE 3-D IMAGE DISPLAY USING SINGLE PROJECTOR

CROSS-REFERENCE TO RELATED APPLICATIONS

This application claims the benefit under 35 U.S.C. § 119 of Korean Patent Application No. 10-2004-116956, filed on Dec. 30, 2004, in the Korean Intellectual Property Office, the disclosure of which is incorporated herein in its entirety by reference.

BACKGROUND OF THE INVENTION

1. Field of the Invention

The present general inventive concept relates to a projection-type 3-dimensional (3-D) image display, and more particularly, to a projection-type 3-D image display to achieve a small size by realizing a 3-D image using a single projector and to improve a resolution of the 3-D image.

2. Description of the Related Art

Generally, a 3-D image is realized through two eyes of a human being using the principle of stereo visual sense. A binocular parallax, which is generated because left and right eyes are located about 65 mm apart from each other, is an important factor in producing a cubic effect. 3-D image displays are divided into displays using glasses and glassless displays. Glassless displays obtain the 3-D image by separating left/right images without using glasses. The glassless displays are divided into parallax barrier type displays and lenticular type displays.

The parallax barrier type displays alternately print images that should be seen respectively by the left and right eyes in the form of a vertical pattern or a photo (in order to see the printed image using an extremely thin vertical lattice column, i.e., a barrier). By doing so, a vertical pattern image that is provided to the left eye and a vertical pattern image that is provided to the right eye are distributed by the barrier and images at different viewpoints are seen by the left and right eyes, respectively, whereby a stereo image is perceived.

A projection-type image display enlarges an image formed by a display element using a projection lens unit, projects the enlarged image on a screen unit, and realizes a 3-D image using a left/right eye image separation unit provided to the screen unit. FIG. 1A is a schematic view illustrating a conventional projection-type image display. The conventional projection-type image display includes a first projector 10 and a second projector 20 and produces a 3-D image by separating images into first images from the first projector 10 and second images from the second projector 20 and sending the first and second images to a right eye (RE) and a left eye (LE) using a screen unit S, respectively.

The screen unit S has a parallax barrier 25 in order to separate the first and second images produced by the first and second projectors 10 and 20 for the RE and the LE, respectively. As illustrated in FIG. 1A, the parallax barrier 25 has slits 26 and barriers 27 arranged in an alternate manner. The images from the first and second projectors 10 and 20 are separated into the first images for the RE and the second images for the LE by the slits 26 to form the 3-D image.

FIG. 1B illustrates the first and second image R and L formed by the conventional projection-type image display of FIG. 1A. Since the first and second images R and L are formed and blocked through the slits 26 and the barriers 27, respectively, the second images L are formed at even-numbered lines only and blocked by the barriers 27 so that black lines K are formed at odd-numbered lines, as illustrated in FIG. 1B. Similarly, the first images R are formed at the odd-numbered lines only and blocked by the barriers 27 so that the black lines K are formed at the even-numbered lines.

Accordingly, a resolution of a display on the whole, as well as a brightness of a 3-D image, deteriorates. Further, since two projectors are used in order to produce the first and second images R and L, a volume of the device is large, not meeting consumer demand for a device having a small size.

SUMMARY OF THE INVENTION

The present general inventive concept provides a projection-type 3-D image display to improve a resolution of a 3-D image and to achieve a small size by realizing the 3-D image using a single projector.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a projection-type 3-D image display, which includes a light source, a singe display element to produce images using light emitted from the light source, an image shift member to time-sequentially shift the images produced by the display element, a projection lens unit to enlarge and project the time-sequentially shifted images, and a screen unit having an image separation unit to separate the projected time-sequentially shifted images into first images to be viewed by a left eye and second image images to be viewed by a right eye.

The image separation unit may be one of a lenticular lens, a fly-eye lens array, and a parallax barrier.

The image separation unit may include a liquid crystal (LC) barrier to selectively switch between a 2-D image and a 3-D image.

The display element may be a liquid crystal display (LCD) or a movable mirror device.

The image shift member may be a rotatable mirror.

The image shift member may operate at the same frequency as that of an image signal input to the display element.

A polarization conversion switch to selectively switch the polarization direction of the images produced by the display element may be disposed between the display element and the image shift member. The image shift member may include a birefringence element whose refractive index changes depending on the polarization direction of the images produced by the display element that have passed through the polarization conversion switch to transmit or refract the images.

The polarization conversion switch may be an LC polarization converter.

The polarization conversion switch may be switched on or off in synchronization with an image signal input to the display element.

The birefringence element may be made of calcite or nematic liquid crystal.

The display element may have a fill factor that depends on a number of view points of an image.

The display element may have a fill factor of 0.5.

The foregoing and/or other aspects of the present general inventive concept may also be achieved by providing a projection-type 3-D (3-dimensional) image display apparatus, including a display unit to form images according to input light and an input image signals, an image shift unit to sequentially control the images formed by the display unit to proceed along first and second paths, a projection unit to enlarge and project the images proceeding along the first and second paths, and a screen unit to focus the projected images proceeding along the first and second paths to first and second predetermined points, respectively.

The foregoing and/or other aspects of the present general inventive concept may also be achieved by providing a method of displaying a 3-D (3-dimensional) image, including producing images using light emitted from a light source and an input image signal, sequentially shifting the images to direct the images along first and second paths, and focusing the images directed along the first path toward a first predetermined viewing position and the images directed along the second path toward a second predetermined viewing position.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
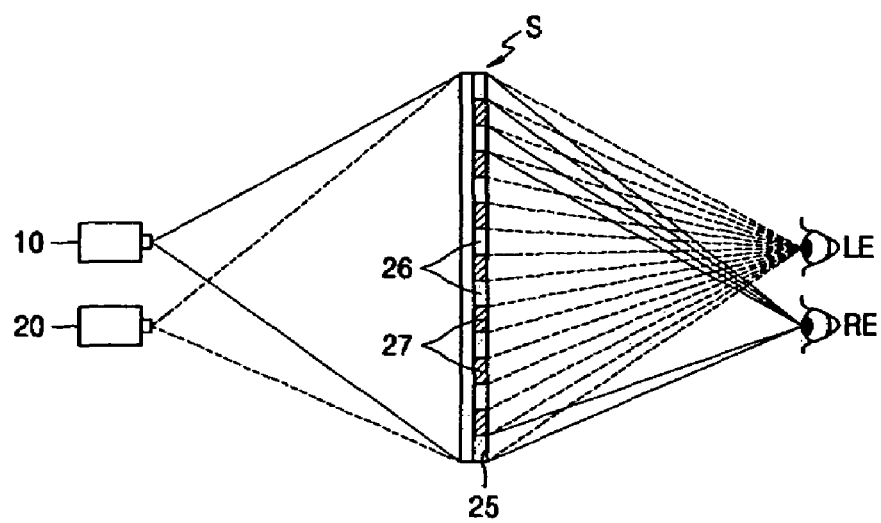
FIG. 1A is a schematic view illustrating a conventional parallax-barrier type projection-type 3-D image display.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

A projection-type 3-D image display according to various embodiments of the present general inventive concept realizes a stereo image by time-sequentially displaying first images R to be viewed by a right eye (RE) and second images L to be viewed by a (LE) using a single projector.

Figure 2A:
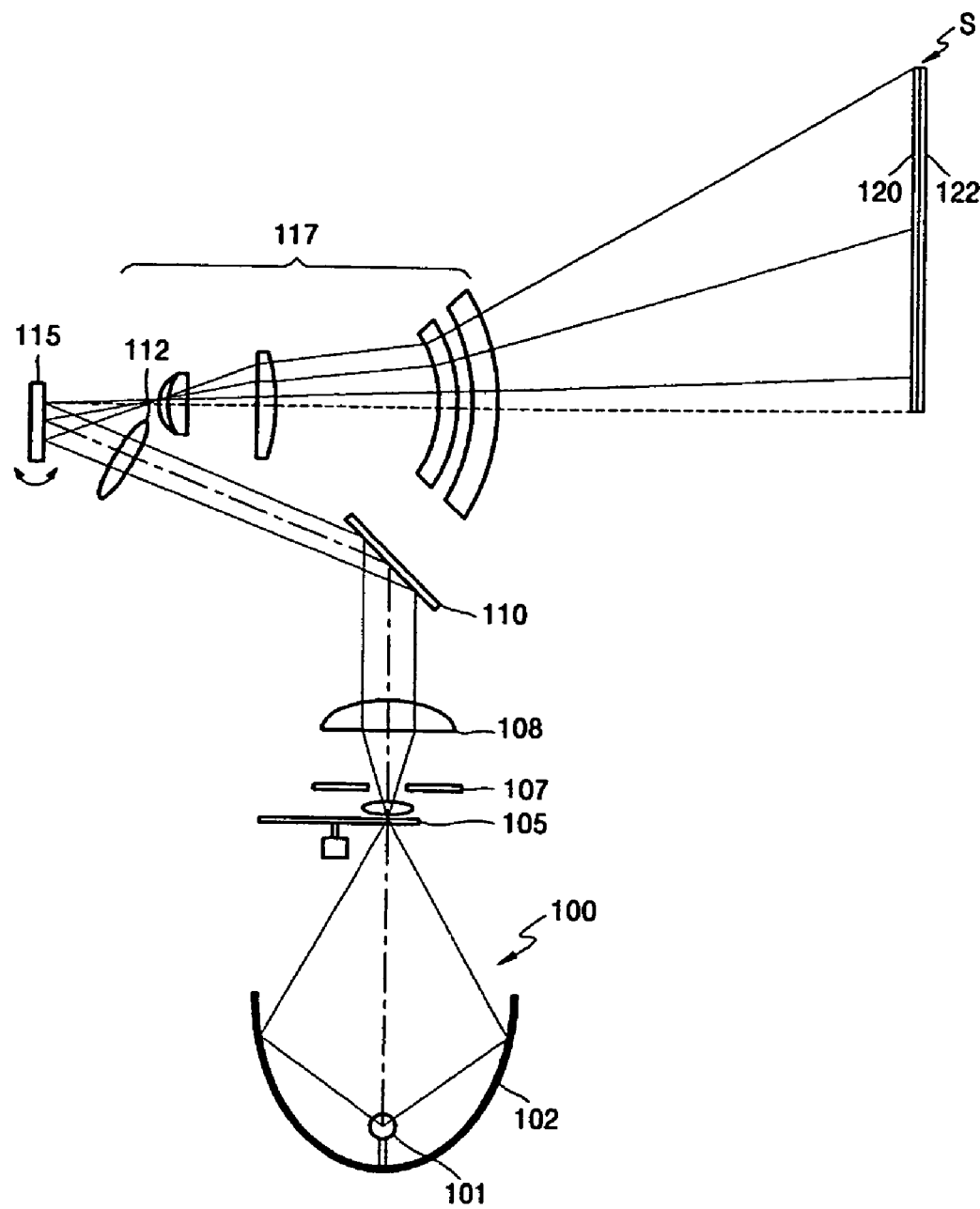
FIG. 2A is a view illustrating a projection-type 3-D image display according to an embodiment of the present general inventive concept.

FIG. 2A illustrates a projection-type 3-D image display according to an embodiment of the present general inventive concept. Referring to FIG. 2A, the projection-type 3-D image display includes a light source 100, a color filter 105 to separate light emitted from the light source 100 according to colors thereof, a display element 110 to process the light separated by the color filter 105 according to an input signal to produce a color image, an image shift member 115 to shift the color image, and a projection lens unit 117 to enlarge the color image and to project the enlarged color image on a screen unit S.

The light source 100 includes a lamp 101 to generate light and a reflection mirror 102 to reflect the light generated by the lamp 101 to guide a progress path thereof. The reflection mirror 102 may be an elliptical mirror with the lamp 101 disposed at one focus thereof and a point at which the light generated by the lamp 101 is condensed at the other focus thereof. Alternatively, the reflection mirror 102 may be a parabolic mirror to convert the light generated by the lamp 101 and reflected by the reflection mirror 102 into parallel rays.

A first relay lens 108 can be disposed on an optical path between the color filter 105 and the display element 110 to cause the light separated by the color filter 105 to be parallel and incident on the display element 110. Also, an aperture 107 can be disposed between the color filter 105 and the first relay lens 108 to regulate a cross-section of light emitted from the light source 100. The aperture 107 shapes the cross-section of the light to match a shape of the display element 110.

A second relay lens 112 can be disposed between the display element 110 and the image shift member 115 to cause the color image produced by the display element 110 to be condensed at a predetermined angle toward the image shift member 115.

A first axis of light reflected by the display element 110 and a second axis of light from the image shift member 115 to the projection lens unit 117 are positioned on different planes from each other so that light travelling the first axis does not interfere with light travelling along the second axis. The display element 110 can be a liquid crystal display (LCD), a ferro LCD, or a movable mirror device. The LCD produces the color image by forming thin film transistors (TFTs) and electrodes in a pixel unit and applying an electric field to liquid crystal thereof. The movable mirror device includes a plurality of micro-mirrors arranged in 2-dimension and each of the micro-mirrors can rotate independently. An incident beam progresses toward the projection lens unit or deviates from the projection lens unit depending on the rotational direction of the micro-mirrors and resultantly the micro-mirrors are switched on or off by pixel unit, so that the color image is realized.

Figure 2B:
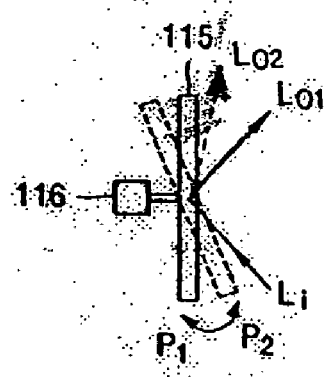
FIG. 2B is a view illustrating an image shift member of the projection-type 3-D image display illustrated in FIG. 2A.

In the image display according to this embodiment of the present general inventive concept, the image shift member 115 can be a mirror that can rotate by a predetermined angle with respect to an optical axis as illustrated in FIG. 2B. An actuator 116 can be provided to rotate the image shift member 115. As the image shift member 115 rotates, a reflection angle of incident light $L_i$ changes. That is, if the image shift member 115 is positioned at a first position $p_1$, the incident light $L_i$ is incident on the image shift member 115 and emitted in a first direction $L_{o1}$. On the contrary, if the image shift member 115 is rotated from the first position $p_1$ and positioned at a second position $p_2$, the incident light $L_i$ is incident on the image shift member 115 and emitted in a second direction $L_{o2}$. As described above, the color image produced by the display element 110 is emitted to different directions, i.e., different angles according to a rotational motion of the image shift member 115.

The screen unit S includes a screen 120 and an image separation unit 122 to separate the color image enlarged and projected by the projection lens unit 117 into first images R to be viewed by the RE and second images L to be viewed by the LE to produce the 3-D image. The image separation unit 122 can be a lenticular lens, a fly-eye lens, or a parallax-barrier. Alternatively, the image separation unit 122 can be a liquid crystal (LC) barrier capable of switching between a 2-D image and a 3-D image.

Figure 3A:
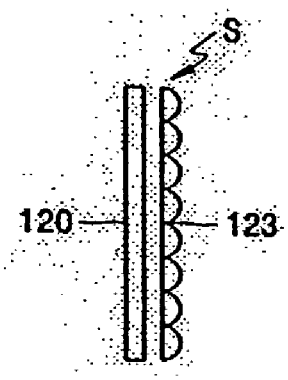
FIGS. 3A and 3B are exemplary views illustrating an image separation unit of a screen unit of the projection-type 3-D image display of FIG. 2A according to various embodiments of the present general inventive concept.
Figure 3B:
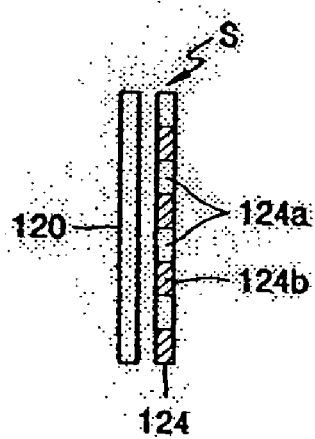

FIG. 3A exemplarily illustrates the screen unit S of FIG. 2A when a lenticular lens 123 is used as the image separation unit 122. The lenticular lens 123 separates the color image incident on the screen unit S into the first images R and the second images L by allowing light incident on the screen unit S at different angles to be focused to different points. That is, the lenticular lens 123 focuses the color image emitted in the first direction $L_{o1}$ from the image shift member 115 at the first position $p_1$ toward the RE and focuses the color image emitted in the second direction $L_{o2}$ from the image shift member 115 at the second position $p_2$ toward the LE. FIG. 3B exemplarily illustrates the screen unit S of FIG. 2A when a parallax-barrier 124 is employed as the image separation unit 122. The parallax-barrier 124 includes slits 124a and barriers 124b arranged in an alternate manner to separate the color image into the first images R and the second images L by allowing the light incident with different angles to be focused to different points using the slits 124a and the barriers 124b. That is, the parallax-barrier 124 focuses the color image emitted in the first direction $L_{o1}$ from the image shift member 115 at the first position $p_1$ toward the RE and focuses the color image emitted in the second direction $L_{o2}$ from the image shift member 115 at the second position $p_2$ toward the LE.

The lenticular lens 123, the parallax-barrier 124, or the fly-eye lens produce the 3-D image by separating the color image incident from the projection lens unit 117 into the first images R and the second images L and condense the respective first and second images R and L to the RE and the LE, respectively. When the image separation unit 122 is embodied as the lenticular lens 123, the parallax-barrier, or the fly-eye lens, the image separation unit 122 can only realize a 3-D image, but may not switch the 3-D image to a 2-D image.

Figure 4A:
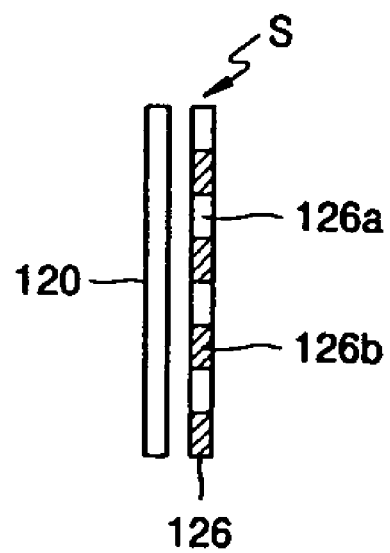
FIGS. 4A and 4B are views illustrating an LC barrier provided as the image separation unit of the screen unit of the projection-type 3-D image display of FIG. 2A according to another embodiment of the present general inventive concept.
Figure 4B:
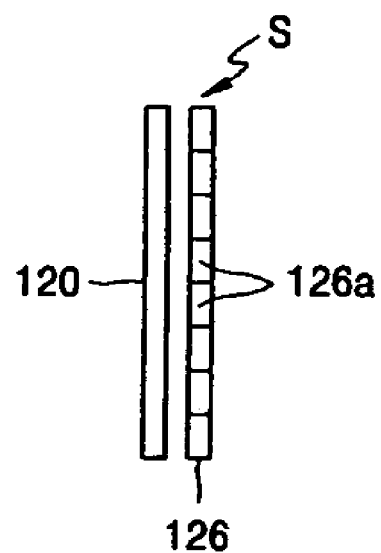

However, when the image separation unit 122 includes an LC barrier 126, as illustrated in FIG. 4A, the image separation unit 122 can selectively switch between the 3-D image and the 2-D image. The LC barrier 126 can selectively form slits 126a or barriers 126b through on/off operation of electrodes connected with the LC. Also, it is possible to transmit the projected image as it is without separating the projected image into the first and second images R and L by turning off all of the electrodes of the LC barrier 126 to allow all of the barriers 126b to function as the slits 126a as illustrated in FIG. 4B. Through such a process, the same images that have passed through the projection lens unit 117 are provided to the RE and the LE such that the 2-D image is realized.

Figure 5A:
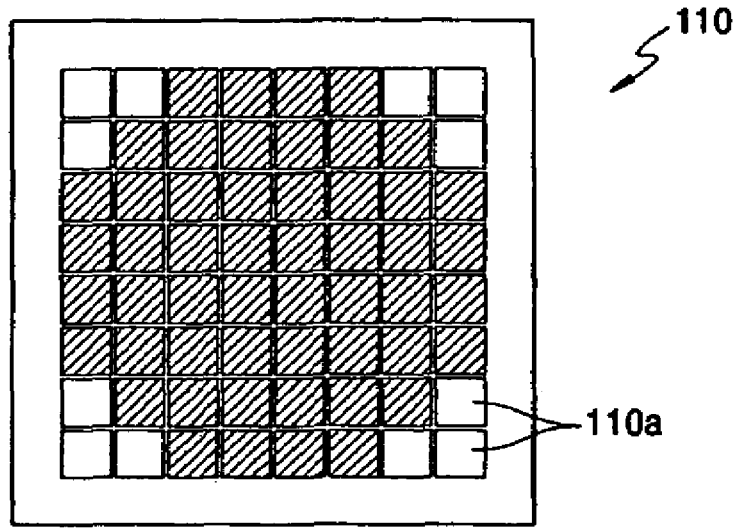
FIGS. 5A and 5B are views illustrating a state in which a fill factor of a display element is 1.0 and state in which the fill factor of the display element is 0.5, respectively.
Figure 5B:
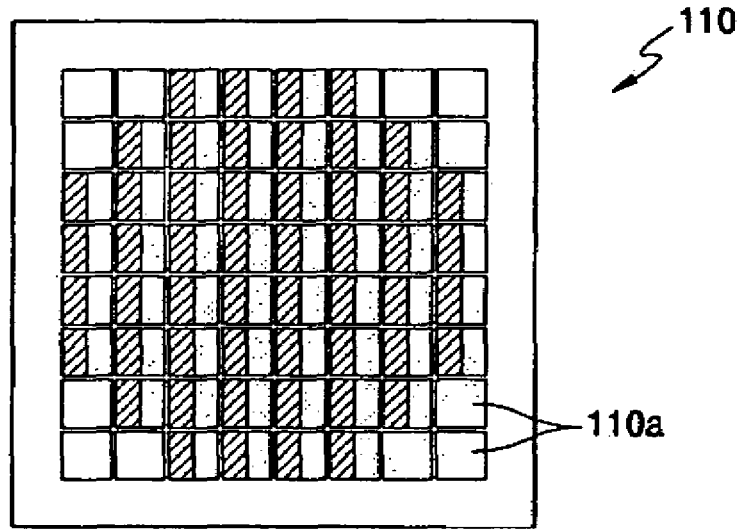

A fill factor of the display element 110 may be 0.5. The fill factor represents a ratio of an effective pixel size to an entire pixel size. The effective pixel size represents a size actually used to produce an image. FIGS. 5A and 5B illustrate cases in which the fill factor is 1.0 and 0.5, respectively. Since the same image signals are input to the display element when the fill factor is 1.0 and 0.5, brightness can deteriorate more or less but resolution does not deteriorate when the fill factor is changed from 1.0 to 0.5. The deterioration of the brightness can be resolved by reinforcing the light source. An arrangement of the effective pixels among pixels 110a of the display element 110 may be the same as that of the slits and the barriers of the parallax-barrier.

As described above, this embodiment of the present general inventive concept can prevent the resolution from deteriorating by controlling the fill factor of the display element 110 when realizing the 3-D image and realizes the 3-D image using a single projector by adopting the image shift member 115.

In operation, the light emitted from the light source 100 passes through the color filter 105 where the light is divided into beams of various colors, e.g., red, green, and blue beams, which are sequentially incident on the display element 110. The display element 110 produces an image by space-modulating the image for each pixel 110a using the input signal. The fill factor of the image produced by the display element 110 can be 0.5, as described above, and accordingly, the display element 110 produces the image as illustrated in FIG. 5B.

Figure 1B:
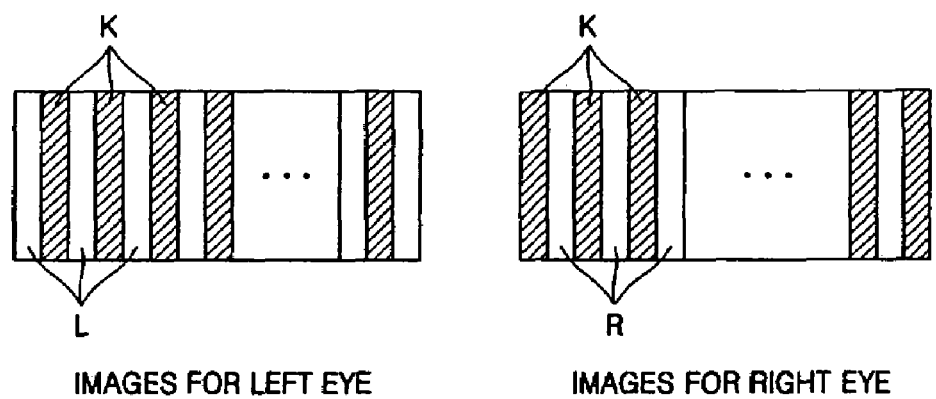
FIG. 1B is a view illustrating first and second images R and L displayed by the conventional 3-D image display illustrated in FIG. 1A.
Figure 6A:
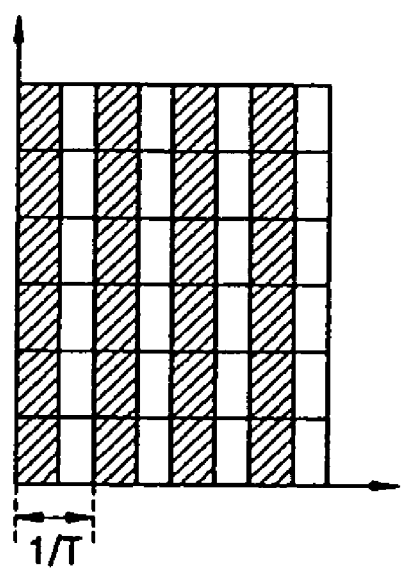
FIGS. 6A and 6B are views illustrating states before and after images are shifted by the image shift member of the projection-type 3-D image display of FIG. 2A, respectively.

The image produced by the display element 110 is reflected by the image shift member 115, enlarged and projected on the screen unit S by the projection lens unit 117, and directed to the eyes (i.e., the RE and the LE) of an observer through the screen unit S. Accordingly, the image produced by the display element 110 with the fill factor of 0.5 is delivered to the screen unit S to produce the first image R. Since the image is produced by the display element 110 with the fill factor of 0.5, the resolution of the first image R is not deteriorated. The first image can be produced as illustrated in FIG. 6A. Referring to FIG. 6A, 1/T represents an operation frequency of the display element 110.

Figure 6B:
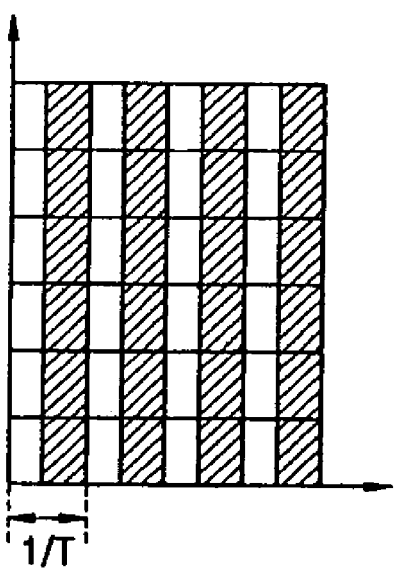

Next, the image shift member 115 rotates such that the image produced by the display element 110 is shifted and the shifted image (i.e., the second image L) is projected on the screen unit S. The shifted second image L can be formed as illustrated in FIG. 6B. The image shift member 115 operates at the same frequency as an image signal of the display element 110 by operating in synchronization with the image signal of the display element 110. Presuming that an image signal processing period of the display element 110 is 'T', a rotation movement period T of the image shift member 115 can also be 'T' and a rotational speed is '1/T'. For example, if an image signal processing speed of the display element 110 is 60 Hz, the image shift member 115 operates by a unit of 1/60 sec. That is, the image shift member 115 rotates one time for one image signal of the display element 110 such that the first and second images R and L are sequentially reflected from the image shift member 115 for the one image signal to produce one frame image. Although the first and second images R and L are described above as being directed toward the RE and the LE, respectively, the screen unit S may alternatively reflect the image emitted from the image shift member 115 at the first position $p_1$ toward the LE and the image emitted from the image shift member at the second position $p_2$ toward the RE.

Figure 7:
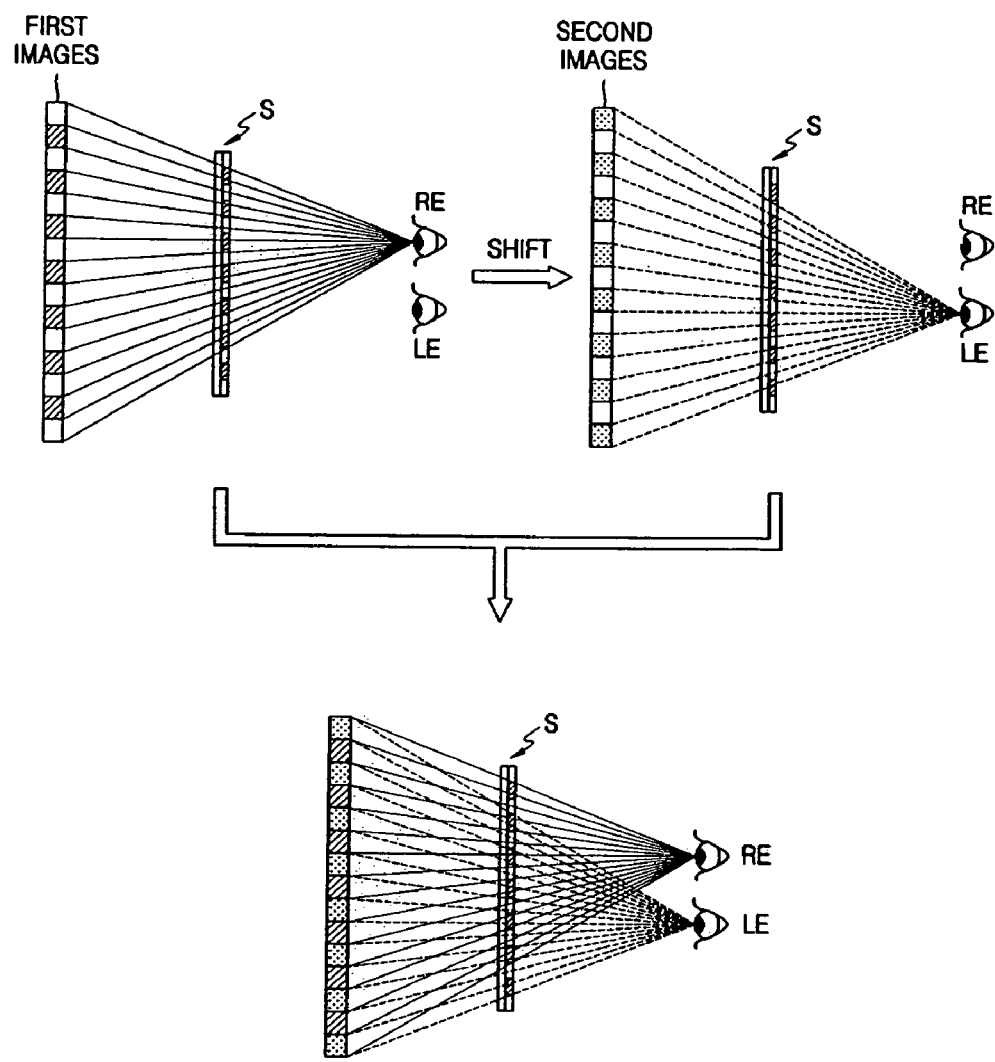
FIG. 7 is a view illustrating a process in which a 3-D image is displayed by the projection-type 3-D image display of FIG. 2A.

FIG. 7 illustrates a process of sequentially forming the first image R and the second image L formed by shifting the first image R and combining the first and second images R and L to produce the 3-D image.

When the image shift member 115 is at the first position $p_1$, the image produced by the display element 110 is enlarged and projected on the screen unit S through the projection lens unit 117 and delivered to the RE by the image separation unit 122. Subsequently, the image shift member 115 rotates a predetermined angle to the second position $p_2$ to shift the image produced by the display element 110 to produce the second image L. The shifted second image L is enlarged and projected on the screen unit S by the projection lens unit 117 and delivered to the LE by the image separation unit 122. The image is separated into the first and second images R and L as described above to produce the 3-D image.

As described above, the image separation unit 122 can be the lenticular lens 123, the fly-eye lens, the parallax-barrier 124, or the LC barrier 126. In the case in which the LC barrier 126 is adopted as the image separation unit 122, electrodes connected with the LC barrier 126 are on/off-operated such that a 2-D image or a 3-D image can be selectively switched.

Figure 8:
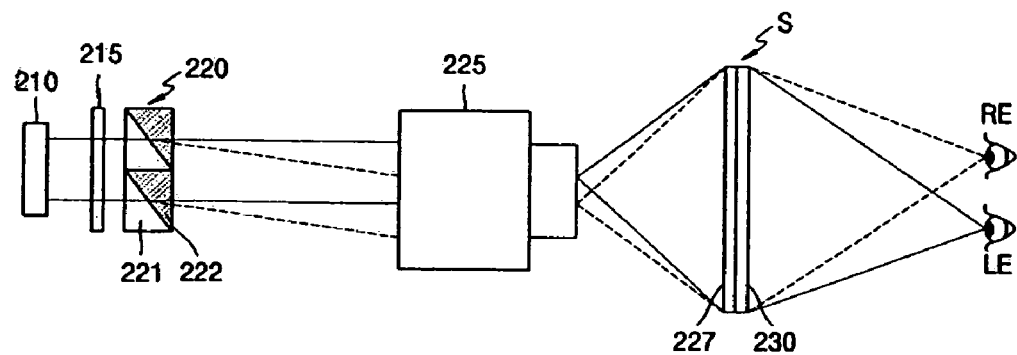
FIG. 8 is a schematic view illustrating a projection-type 3-D image display according to another embodiment of the present general inventive concept.

FIG. 8 illustrates a projection-type 3-D image display according to another embodiment of the present general inventive concept. The projection-type 3-D image display of this embodiment includes a display element 210 to produce an image, a polarization conversion switch 215 to selectively switch a polarization direction of the image produced by the display element 210, and an image shift member 220 to change a refractive index thereof depending on the polarization direction of the image to shift the image.

The display element 210 can be a polarization-dependant liquid crystal display (LCD), an FLCD, or a transmissive or reflective type display. The polarization conversion switch 215 can be an LC polarization converter and switches the polarization direction of incident light by selectively applying a power for each pixel.

The image shift member 220 includes a prism 221 and a birefringence element 222 whose refractive index changes depending on the polarization direction of incident light. The prism 221 and the birefringence element 222 can each have a triangular-prism shape and can be joined to each other. The image shift member 220 can include a plurality of prisms 221 and birefringence elements 222 arranged in the form of an array. Otherwise, the image shift member 220 can include one prism 221 and one birefringence element 222.

The birefringence element 222 has a property that a refractive index thereof changes depending on the polarization direction of incident light. That is, a normal ray having a polarization direction parallel with a crystal optical axis of the birefringence element is transmitted as it is according to a normal refractive index of the birefringence element, and an abnormal ray having a polarization direction perpendicular to the crystal optical axis of the birefringence element is refracted according to an abnormal refractive index of the birefringence element. Therefore, when light of P polarization and light of S polarization pass through the birefringence element 222, the light is refracted at different angels, respectively. The birefringence element can be made of calcite or nematic liquid crystal, for example.

The prism 221 has the same refractive index as the normal refractive index of the birefringence element. The normal ray, e.g., light of P polarization, passes through a boundary surface between the prism 221 and the birefringence element 222 without refraction and the abnormal ray, e.g., light of S polarization, is refracted at the boundary surface.

A first image of light having a first polarization and a second image of light having the second polarization are produced sequentially in time by interaction between the polarization conversion switch 215 and the image shift member 220 and are incident on a screen unit S through a projection lens unit 225 at different angles. Similar to the embodiment of FIG. 2A, the screen unit S includes a screen 227 and an image separation unit 230. The first and second images incident on the screen unit S at the different angles by the image shift member 220 are directed to the RE and the LE, respectively, by the image separation unit 230 to produce a stereo image. Since the image separation unit 230 has the same construction as the image separation unit 122 described with reference to FIGS. 2A, 3A, 3B, 4A, and 4B, a detailed description thereof will be omitted. In the case in which the LC barrier is adopted as the image separation unit 230, a 2-D image or a 3-D image can be selectively displayed.

Operations of the 3-D image display of the embodiment of FIG. 8 are described below.

The image emitted from the display element 210 has a predetermined first polarization direction, e.g., the P polarization direction, and is incident on the polarization conversion switch 215. The polarization conversion switch 215 is turned off to transmit the image as it is without changing the first polarization direction of the image. Presuming that the first polarization direction has a polarization direction parallel with a crystal optical axis of the birefringence element 222, the first image having the first polarization direction passes through the prism 221 and the birefringence element 222. For example, the first image having the P polarization passes through the birefringence element 222 in a straight line, whereas light having the S polarization is refracted by the birefringence element 222.

The first image having the first polarization passes through the birefringence element 222 without refraction and is enlarged and projected on the screen unit S by the projection lens unit 225 to direct the first image to the RE through the image separation unit 230. Subsequently, when the image having the first polarization direction is incident on the polarization conversion switch 215, the polarization conversion switch 215 is turned on to switch the polarization direction of the image. Accordingly, the second image whose polarization direction is switched from the first polarization direction to a second polarization direction by the polarization conversion switch 215 is incident on the image shift member 220. The second image having the second polarization direction, e.g., the S polarization, has a polarization direction perpendicular to the crystal optical axis of the birefringence element 222 and is refracted to a direction different from the direction of the first image having the first polarization. Therefore, the first and second images originate from the same image information and are shifted by the birefringence element 222 depending on the polarization directions thereof.

The second image having the second polarization direction is shifted by the birefringence element 222 is incident on the screen unit S at an angle different from the first image by the projection lens unit 225. Accordingly, the second image is directed to the LE through the image separation unit 230.

The polarization conversion switch 215 operates at the same frequency as and in synchronization with the image signal of the display element 210. For example, if an image signal processing speed of the display element 210 is 60 Hz, the polarization conversion switch 215 on/off-operates by unit of 1/60 sec. That is, the polarization conversion switch 215 on/off-operates one time for one image signal of the display element 210 such that the first image having the first polarization direction and the second image having the second polarization direction are sequentially output for one image signal.

If the polarization conversion switch 215 is in an off-state, the image produced by the display element 210 according to the image signal passes through the birefringence element 222 without change in its polarization direction to produce the first image. If the polarization conversion switch 215 is in an on-state, the image produced by the display element 210 according to the image signal is switched in its polarization direction and refracted by the birefringence element 222 to produce the second image shifted relative to the first image.

Accordingly, the first image of the first polarization direction and the second image of the second polarization direction are combined to produce a one frame 3-D image.

The present general inventive concept can realize a 3-D image using a single display element by shifting images using a movable mirror device as illustrated in the embodiment of FIG. 2A in a case in which the one of a liquid crystal display (LCD), a ferro LCD (FLCD), or a movable mirror device is adopted as a display element, or by shifting images using a polarization conversion switch and a birefringence element as illustrated in the embodiment of FIG. 8 in a case in which the LCD or the FLCD is adopted as a display element.

A projection-type 3-D image display according to the embodiments of the present general inventive concept can provide images at a plurality of view points by shifting the images for one image signal using an image shift member. Although in the embodiments illustrated above, one frame image is produced using one set of images at two view points, it is possible to produce one frame image using images at three or more view points by adjusting a rotational angle of the image shift member. Also, a display element can have a fill factor that depends on the number of view points and sequentially enlarges and projects the images from the view points. The fill factor of the display element may be a reciprocal number of the number of the view points. For example, if the number of the view points is 2, the fill factor of the display element may be ½ and if the number of the view points is 3, the fill factor of the display element may be ⅓. The image shift member can rotate by a predetermined angle according to the number of the view points to shift the images.

A projection-type 3-D image display according to the embodiments of the present general inventive concept can realize a 3-D image using a single projector by having an image shift member to time-sequentially shift images produced by a display element. By doing so, a volume of the projection-type 3-D image display can be made small and manufacturing costs can be cut down. Also, it is possible to prevent the resolution from deteriorating when displaying a 3-D image by setting a fill factor of the display element to 0.5.

Further, it is possible to switch between a 2-D image and a 3-D image as desired by an observer by adopting an LC barrier as an image separation unit and it is also possible to realize a large-scale 3-D image by enlarging and projecting a 3-D image on a screen unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection-type 3-D (3-dimensional) image display device comprising:
   a light source;
   a single display element to sequentially produce images for a left eye and images for a right eye using light emitted from the light source;
   an image shift member to time-sequentially shift the images produced by the display element;
   a projection lens unit to enlarge and project the time-sequentially shifted images; and
   a screen unit having an image separation unit to separate the projected time-sequentially shifted images into the images for a left eye and the images for a right eye,
   wherein the image separation unit comprises one of a lenticular lens, a fly-eye lens array, and a parallax barrier.

2. The device of claim 1, wherein the display element comprises one of an LCD (liquid crystal display), an FLCD (ferro liquid crystal display), and a movable mirror device.

3. The device of claim 1, wherein the image shift member comprises a rotatable mirror.

4. The device of claim 3, wherein the image shift member operates at the same frequency as that of an image signal input to the display element.

5. The device of claim 1, further comprising:
   a polarization conversion switch disposed between the display element and the image shift member to selectively switch a polarization direction of the images produced by the display element, wherein the image shift member comprises one or more birefringence elements whose refractive indexes change depending on the polarization direction of the images that have passed through the polarization conversion switch to transmit or refract the images.

6. The device of claim 5, wherein the polarization conversion switch is an LC (liquid crystal) polarization converter.

7. The device of claim 5, wherein the polarization conversion switch is switched on or off in synchronization with an image signal input to the display element.

8. The device of claim 5, wherein the one or more birefringence elements comprise one of calcite and nematic liquid crystal.

9. The device of claim 5, wherein the image shift member further comprises one or more prisms bonded to the one or more birefringence element.

10. The device of claim 9, wherein the one or more birefringence elements and the one or more prisms are arranged in an array.

11. The device of claim 1, wherein the display element has a fill factor that depends on a number of view points of an image.

12. The device of claim 1, wherein the display element has a fill factor of 0.5.

13. A projection-type 3-D (3-dimensional) image display device comprising:
   a light source;
   a single display element to sequentially produce images for a left eye and images for a right eye using light emitted from the light source;
   an image shift member to time-sequentially shift the images produced by the display element;
   a projection lens unit to enlarge and project the time-sequentially shifted images; and
   a screen unit having an image separation unit to separate the projected time-sequentially shifted images into the images for a left eye and the images for a right eye,
   wherein the image separation unit comprise an LC (liquid crystal) barrier to selectively switch between a 2-D image and a 3-D image.

14. A projection-type 3-D (3-dimensional) image display apparatus, comprising:
   a display unit to form images according to input light and an input image signals;
   an image shift unit to sequentially control the images formed by the display unit to proceed along first and second paths;
   a projection unit to enlarge and project the images proceeding along the first and second paths; and
   a screen unit to focus the projected images proceeding along the first and second paths to first and second predetermined points, respectively,
   wherein the screen unit has an image separation unit comprising one of a lenticular lens, a fly-eye lens array, a parallax barrier, and a LC (liquid crystal barrier).

15. The apparatus of claim 14, wherein the first predetermined point corresponds to one of right and left eyes of a viewer, and the second predetermined point corresponds to the other one of the right and left eye of the viewer.

16. The apparatus of claim 14, wherein the image shift unit comprises:
  a movable mirror to periodically move between a first position to reflect the images to proceed along the first path and a second position to reflect the images to proceed along the second path.

17. A method of displaying a 3-D (3-dimensional) image, comprising:
  producing images using light emitted from a light source and an input image signal;
  sequentially shifting the images to direct the images along first and second paths; and
  focusing the images directed along the first path toward a first predetermined viewing position and the images directed along the second path toward a second predetermined viewing position by using an image separation unit comprising one of a lenticular lens, a fly-eye lens array, a parallax barrier, and a LC (liquid crystal) barrier.

18. The method of claim 17, wherein the sequentially shifting of the images comprises:
  periodically rotating a mirror between first and second positions to direct the images along the first and second paths.

19. The method of claim 17, wherein the sequentially shifting of the images comprises:
  sequentially controlling the images to have first and second polarization directions; and
  directing the images along the first and second paths according to polarization direction thereof.

20. The method of claim 17, wherein the focusing of the images directed along the first path toward a first predetermined viewing position and the images directed along the second path toward a second predetermined viewing position comprises:
  enlarging and projecting the images directed along the first and second paths to be incident on a screen at first and second angles, respectively; and
  condensing the images incident on the screen at the first and second angles to the first and second predetermined viewing positions, respectively.

21. A projection-type 3-D (3-dimensional) image display device comprising:
  a light source;
  a single display element to sequentially produce images at a plurality of view points using light emitted from the light source;
  an image shift member to time-sequentially shift the images produced by the display element;
  a projection lens unit to enlarge and project the time-sequentially shifted images; and
  a screen unit having an image separation unit to separate the projected time-sequentially shifted images into the images at a plurality of view points,
  wherein the image separation unit comprises one of a lenticular lens, a fly-eye lens array, a parallax barrier, and a LC (liquid crystal barrier).

* * * * *

UNITED STATES PATENT AND TRADEMARK OFFICE
CERTIFICATE OF CORRECTION

PATENT NO. : 7,607,780 B2  Page 1 of 1
APPLICATION NO. : 11/262854
DATED : October 27, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Twelfth Day of October, 2010

David J. Kappos
*Director of the United States Patent and Trademark Office*